United States Patent

Phillips

Patent Number: 5,791,141
Date of Patent: *Aug. 11, 1998

[54] METHOD AND APPARATUS FOR REDUCTION OF FLUID BORNE NOISE IN HYDRAULIC SYSTEMS

[75] Inventor: Edward H. Phillips, Troy, Mich.

[73] Assignee: Techco Corp., Southfield, Mich.

[*] Notice: The term of this patent shall not extend beyond the expiration date of Pat. No. 5,697,216.

[21] Appl. No.: 665,452

[22] Filed: Jun. 18, 1996

Related U.S. Application Data

[63] Continuation-in-part of Ser. No. 630,587, Apr. 10, 1996, which is a continuation-in-part of Ser. No. 421,628, Apr. 13, 1995, Pat. No. 5,582,006, which is a continuation-in-part of Ser. No. 236,483, Apr. 29, 1994, Pat. No. 5,475,976.

[51] Int. Cl.⁶ .................................................. F16D 31/02
[52] U.S. Cl. ........................... 60/327; 60/469; 417/540
[58] Field of Search .................... 60/327, 469; 417/540, 417/312; 138/26; 181/252, 256

[56] References Cited

U.S. PATENT DOCUMENTS

| | | |
|---|---|---|
| 3,018,799 | 1/1962 | Volkmann et al. |
| 3,323,305 | 6/1967 | Klees |
| 3,655,059 | 4/1972 | Johnson |
| 3,765,506 | 10/1973 | Strunk |
| 4,024,698 | 5/1977 | Weiss et al. |
| 4,067,195 | 1/1978 | Malecha |
| 4,600,035 | 7/1986 | Sugimura |
| 4,671,380 | 6/1987 | Henderson et al. |
| 4,712,644 | 12/1987 | Sun |
| 5,101,930 | 4/1992 | Fargo et al. |
| 5,172,729 | 12/1992 | Vantellini |
| 5,183,974 | 2/1993 | Wilhelm et al. |
| 5,475,976 | 12/1995 | Phillips ........................ 60/327 |
| 5,582,006 | 12/1996 | Philips ........................ 60/327 |

OTHER PUBLICATIONS

Dayco Presents, M. van Ruiten, Oct. 26, 1993.
Analysis of Tuning Cables for Reduction of Fluidborne Noise In Automotive Power Steering Hydraulic Lines, Mardi C. Hastings et al, The Ohio State Univ. (no data).

*Primary Examiner*—Hoang Nguyen
*Attorney, Agent, or Firm*—Gifford, Krass, Groh, Sprinkle, Patmore, Anderson & Citkowski, P.C.

[57] ABSTRACT

Method and improved apparatus for reduction of fluid borne noise in a hydraulic system are disclosed. A shortened noise suppression assembly comprising first, second and third volumetrically compliant members with first and second inductive flow members providing fluidic coupling therebetween is disclosed. The shortened noise suppression assembly acts similarly to an electronic low pass filter network in deterring fluid borne noise from entering portions of the hydraulic system located therebeyond. At least one of the first and third volumetrically compliant members are comprised within a stub line. The remaining one, or ones, of the first, second and third volumetrically compliant members, and the first and second inductive flow members form conduit members of a passage for connecting a pump to the portions of the hydraulic system located therebeyond.

7 Claims, 8 Drawing Sheets

_Fig-13_

_Fig-14A_

_Fig-14B_

METHOD AND APPARATUS FOR REDUCTION OF FLUID BORNE NOISE IN HYDRAULIC SYSTEMS

CROSS REFERENCE TO RELATED APPLICATIONS

The present invention is a continuation-in-part of U.S. Ser. No. 08/630,587 filed Apr. 10, 1996 and entitled "METHOD AND APPARATUS FOR REDUCTION OF FLUID BORNE NOISE IN HYDRAULIC SYSTEMS" which was a continuation-in-part of U.S. Ser. No. 08/421,628 filed Apr. 13, 1995 and entitled "METHOD AND APPARATUS FOR REDUCTION OF FLUID BORNE NOISE IN HYDRAULIC SYSTEMS", now U.S. Pat. No. 5,582,006, which, in turn, was a continuation-in-part of U.S. Ser. No. 08/236,483 filed Apr. 29, 1994 and entitled "METHOD AND APPARATUS FOR REDUCTION OF FLUID BORNE NOISE IN HYDRAULIC SYSTEMS" now U.S. Pat. No. 5,475,976 issued Dec. 19, 1995.

BACKGROUND OF THE INVENTION

1. Field of the Invention

The present invention relates generally to hydraulic systems and, more particularly, to significantly reducing fluid borne noise commonly present in such systems with particular reference to reduction of noise in vehicular power steering systems.

2. Description of the Prior Art

Fluid borne noise is commonly present in hydraulic systems powered by pumping apparatus such as gear, vane or piston pumps. Typically, the noise results when pressure waves are generated as the alternating portion of pump flow encounters system flow impedances. The alternating portion of pump flow can be generated by the pumping apparatus as a combination of any, or all, of the following three types of disturbances:

1. Kinematic flow ripple, which is a function of pump geometry. By way of example, the flow output of a piston pump is generally a summation of an odd number of pistons moving in a sinusoidal manner. This results in flow ripple whose fundamental frequency is equal to the product of the pump's rotational speed and the number of pistons.

2. Compression flow ripple, which is a result of compression, or decompression, of a trapped fluid volume. Compression flow ripple is commonly encountered in gear pumps as the pump's gears mesh. This is because the gears mesh with a contact ratio greater than one whereby fluid can be trapped between succeeding sets of teeth whenever they are concomitantly in contact.

3. Leakage flow ripple, which is a result of pressure differentials across varying leakage paths formed between moving and stationary pump components.

Fluid borne noise present in a hydraulic system causes mechanical apparatus such as hydraulic lines, control valves, hydraulic motors, and supporting structural members to vibrate. In many cases such vibration is coupled to the atmosphere and is the source of objectionable acoustic noise. It is desirable to attenuate such fluid borne noise near a hydraulic system's pumping apparatus thereby isolating the rest of the system and minimizing vibration and resulting acoustic noise.

Fluid borne noise reduction apparatus of the prior art usually comprises a flexible metal tube, called a tuning cable, placed inside a section of volumetrically compliant hose. Such prior art apparatus is described in U.S. Pat. No. 3,323,305 entitled ATTENUATION DEVICE and issued to G. T. Klees in June 1967. Although such tuning cable designs are based upon destructive interference principles, their performance has never been fully analyzed. For instance, the automotive industry has resorted to empirical methods and subjective evaluations in applying the technology to vehicular power steering systems wherein its success has been marginal at best. The following quotation from SAE Technical Paper No. 931295 entitled *Analysis of Tuning Cables for Reduction of Fluidborne Noise in Automotive Power Steering Hydraulic Lines* by M. C. Hastings and C. C. Chen given in May 1993 (which paper comprises mathematical techniques for analysis of the prior art technology) illustrates this point:

"The distributed parameter mathematical model does accurately predict attenuation of the pressure wave in simple (straight line) systems. In more complex systems, however, overall attenuation is a function of configuration, including the number of discontinuities and support points, and varies as a function of frequency. In real systems with many curves, bends and other discontinuities, the complex fluid-structure interaction dominates and tuning cables may have little, if any, effect on noise reduction in the frequency range of interest."

As a matter of fact, this analysis misses the mark slightly because the supposed destructive interference usually does not occur. This is for three reasons. Firstly, the pumping apparatus acts in the manner of an alternating flow source rather than an alternating pressure source in issuing the offending noise signal. Thus, it presents a substantially infinite source impedance to the tuning cable. Secondly, the tuning cable is usually spirally wound with a discontinuous wall. This results in distributed leakage along the length of the tuning cable. Thirdly, because of the expandable nature of the volumetrically compliant hose, effective bulk modulus of fluid flowing therewithin is as much as 30 times smaller than that of an infinite body of the fluid itself. Thus, sound velocity and therefore wavelength vary from assumed values by as much as a factor of 5.5 in the annular space outside of the tuning cable.

In effect, prior art noise reduction apparatus comprises a distributed coupling of pressure to the volumetrically compliant hose which substantially acts like a continuous array of individual sound sources. Because of the disparate velocities of sound and wavelength on either side of the tuning cable wall, sound waves emanating from the various sound sources hopefully arrive largely out of phase at the end of the tuning cable and more-or-less cancel one another to achieve some actual sound transmission reduction.

In fact, the above described technique is utilized in fluid borne noise reduction apparatus manufactured by Techno-Chemie, Kessler & Co. GMBH of Karben, Germany. In their apparatus, a plastic tube having periodically located holes in its wall is substituted for the above described tuning cable. Tuning such an apparatus for a particular vehicle involves selecting such things as tube and hose lengths, hole size and number of holes etc. for the best result based on considerable testing and the like.

SUMMARY OF THE INVENTION

Accordingly, the present invention is directed to method and apparatus for substantially eliminating fluid borne noise in hydraulic systems. The method and apparatus are particularly directed to eliminating power steering pump (hereinafter referred to as "pump") sourced noise from vehicles comprising a power steering system.

3

In a preferred embodiment an improved isolating hose assembly attenuates fluid borne noise incident thereupon, thus effectively isolating the remainder of a host hydraulic system from its pump sourced fluid borne noise. The improved isolating hose assembly acts as a low pass filter and is quite simple in nature, comprising a first volumetrically compliant member followed by a first relatively small diameter inductive flow member, a second volumetrically compliant member, a second relatively small diameter inductive flow member, and a third volumetrically compliant member. The improved isolating hose assembly acts similarly to an electronic low pass filter network optimized for use with an alternating current source.

In analyzing the improved isolating hose assembly, the pump is regarded as an alternating flow source. If the pump's bypass flow control orifice is open, a resistive source impedance representing the partially open bypass flow control orifice is positioned in parallel with the alternating flow source. Then the remaining alternating flow is transmitted to the improved isolating hose assembly via passageways, orifices, fittings and tubing which is represented primarily as a series inductor. The volumetrically compliant members of the improved isolating hose assembly function in a manner similar to bypass capacitors to ground for preferentially bypassing alternating fluid flow components of a hydraulic signal and are so represented. The inductive flow members of the improved isolating hose assembly function in a manner similar to series inductors for impeding further transmission of remaining alternating fluid flow components and are so represented. And, a resistive load representing the orifices of the system's control valve is positioned in parallel with a series arrangement of an inductor representing a cylinder line and a capacitor representing the volume of fluid in the cylinder of the system's steering gear to form a load impedance. Finally, the load impedance is coupled to a series inductor representing the fittings and tubing which couple the improved isolating hose assembly thereto.

Utilization of the improved isolating hose assembly results in significantly reduced fluid borne noise levels in the control valve over frequencies of interest. However, at selected frequencies where any of the volumetrically compliant members are integer multiples of half wavelengths long, they can become resonant cavities whereby their effectiveness as capacitors to ground can be compromised. This effect is often exacerbated at the high system pressures encountered during parking. In some cases the second volumetrically compliant member can become so compromised over a range of instant operating frequencies that there is a concomitant deleterious resonance. In particular, it has been found that this resonance can enable noise basically comprising the single resonant frequency to pass through an improved isolating hose assembly configured strictly according to the preferred embodiment.

Therefore, in a first additional preferred embodiment, a resistive orifice or nozzle element is introduced into a modified isolating hose assembly to break the second volumetrically compliant member into two cavities, each having a higher resonant frequency. The hydraulic resistance of the resistive orifice or nozzle element is selected with a resistance value large enough to at least critically damp any remaining resonance. And, the individual hose lengths utilized in the modified isolating hose assembly are chosen to be of disparate lengths such that no two sections can be resonant concomitantly.

Thus far, no consideration has been given to sound pressure present within the pump. This is because the pump has been regarded as an alternating flow source having infinite source impedance as is mentioned above. However, it has been found that excessive sound pressure contained within the pump can be transmitted as structure borne noise and therefore is undesirable. For this reason, isolating hose assemblies constructed according to the preferred and first additional preferred embodiments are always configured with minimal input section tubing lengths. However, the above noted passageways, orifices and fittings as well as unavoidable input section tubing length, result in undesirable inductive and resistive impedance in series between the pump and first bypass capacitive hose section. This results in undesirable levels of sound pressure within the pump.

Therefore, in a second additional preferred embodiment, provision is made for mounting the first bypass capacitive hose section directly on the pump in an improved apparatus for reduction of fluid and structure borne noise in hydraulic systems. The first bypass capacitive hose section is then coupled directly to the pump output with minimal inductive impedance therebetween. Not only does this reduce levels of sound pressure within the pump, it makes beneficial use of the impedances presented by the above noted passageways, orifices, fittings and tubing to implement the function of the first inductive flow member. The remaining transmissive portion of the isolating hose assembly may be configured according to either the remaining portions of the preferred embodiment or a combination of the preferred and first additional preferred embodiments. In either case the remaining transmissive portion of the isolating hose assembly is physically shorter (by the lengths of the first capacitive hose section and the first inductive flow member) and suffers less pressure drop than isolating hose assemblies configured strictly according to either of the preferred embodiment or a combination of the preferred and first additional preferred embodiments.

Sometimes it is not possible to affix the first bypass capacitive hose section to the pump because of geometric constraints imposed as a consequence of pump placement. Also, overall geometric constraints may limit available space for placement of an isolating hose assembly. For instance, the steering gear control valve and the pump may be closely placed. In addition, the available space may be of limited volumetric size and have odd geometric proportions.

Therefore, in a third additional preferred embodiment, a shortened noise suppression assembly is presented wherein first and third bypass capacitive hose sections are physically placed in parallel with the assembly's first and second inductive flow members, respectively. Because there is only one hose section left, it is formed in a gentle arc to accommodate variation in the placement of the steering gear control valve relative to the pump.

BRIEF DESCRIPTION OF THE DRAWINGS

The foregoing and other objects and advantages of the present invention will become readily apparent to those skilled in the art upon studying the following detailed description, when considered in connection with the accompanying drawings, in which.

DETAILED DESCRIPTION OF THE PREFERRED EMBODIMENTS

Figure 1:
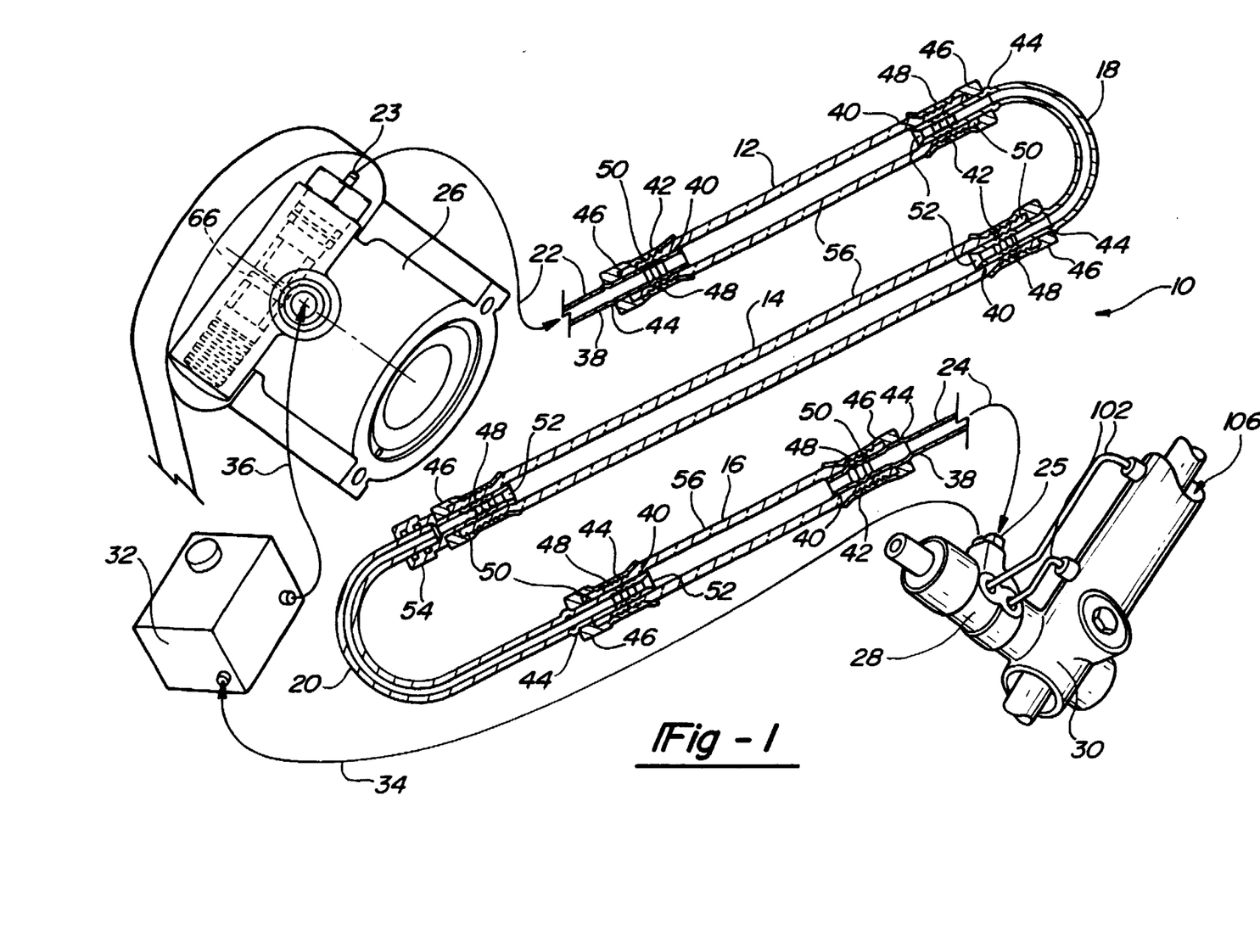
FIG. 1 is a partially schematic cross-sectional view of an improved isolating hose assembly in accordance with a preferred embodiment of the invention.

An improved isolating hose assembly 10 of the present invention comprising first, second and third volumetrically compliant members 12, 14 and 16, respectively, and first and second inductive flow members 18 and 20, respectively, is shown in FIG. 1. The volumetrically compliant members are formed of high expansion hose such as Dayco No. DF 3289 (i.e., which has an inside diameter of 0.375 in. and expands volumetrically by about 50% at 1,300 psi). In addition, improved isolating hose assembly 10 comprises input and output sections 22 and 24, respectively. Improved isolating hose assembly 10 is used to convey pressurized fluid from an engine driven pump 26 to a control valve 28 of a steering gear 30. Spent fluid is then returned to a reservoir 32 by a return line 34. Incoming fluid is supplied to the pump 26 from the reservoir 32 via a suction line 36.

Each one of input and output sections 22 and 24 includes tubing 38 formed with a taper section 40, "ripple" section 42, and axial position locating flange 44. Then a collar fitting 46 comprising internal ridges 48 is positioned over the "ripple" section 42 and against axial position locating flange 44. The taper section 40 is inserted in an end 50 in either of the first or third volumetrically compliant members 12 or 16 and a collar fitting 46 is crimped in a known manner to form a pressure-tight connection between each set of input ends 50 and "ripple" sections 42. In addition, respective input and output ends of input and output sections 22 and 24 respectively comprise fittings 23 and 25 for sealingly connecting them to the pump 26 and control valve 28, respectively, in a known manner.

Each one of the inductive flow members 18 and 20 is formed from small bore tubing and comprises taper sections 40, "ripple" sections 42, and axial position locating flanges 44. Similarly to the input and output sections 22 and 24 described above, collar fittings 46 comprising internal ridges 48 are positioned over "ripple" sections 42 and against respective axial position locating flanges 44. Then each taper section 40 is inserted in an end 50 of its respective volumetrically compliant member 12, 14 or 16 and a collar fitting 46 is crimped as before. In this case however, openings 52 of each end of the small bore tubing are formed in a flared manner. This enables smooth fluid entry or exit from each hose section and reduces overall pressure loss in the improved isolating hose assembly 10.

As depicted in FIG. 1, the first and second inductive flow members 18 and 20 are each formed with a 180° bend thus resulting in a three legged configuration of improved isolating hose assembly 10. Because of physical interference problems with reference to commonly known industrial crimping apparatus (not shown), it may be necessary to include a connection such as quick connect fitting 54 in the center leg of the improved isolating hose assembly 10 (e.g., comprising volumetrically compliant member 14) in order to actually perform all of the required crimping operations of such a version of the improved isolating hose assembly 10.

Alternately, the quick connect fitting 54 may be eliminated by utilizing a specially designed high volume production crimping apparatus known as an open-face crimper. Such open-face crimpers have a slot formed between a pair of their crimping fingers for receiving pre-crimped portions of the hose assemblies radially rather than axially. After crimping, the now crimped portion of the hose assembly is then removed radially through the slot.

While the above described configuration of improved isolating hose assembly 10 has no meaningful effect upon its acoustic performance, it does have the practical effect of substantially eliminating relative axial movement of the input and output sections 22 and 24 as pressure is variably applied. This result is achieved despite the fact that high expansion hose typically comprises woven reinforcement material and suffers a length change concomitantly with effecting the desired volumetric compliance for each volumetrically complaint member 12,14 and 16.

Disparate active hose lengths for the volumetrically compliant members 12,14 and 16 are chosen in order to eliminate the possibility of simultaneous multiple hose resonances, and in order to optimize filter performance generally. As depicted in FIG. 1, the respective active hose lengths for volumetrically compliant members 12, 14 and 16 have been chosen according to the rules $I_{14}=1.618\ I_{12}$ and $I_{16}=0.618\ I_{12}$ where $I_{12}$ is the active length of the first volumetrically compliant member 12, $I_{14}$ is the active length of the second volumetrically compliant member 14 and $I_{16}$ is the active length of the third volumetrically compliant member 16. These ratios were chosen because they implement the relationship 0.618=1/1.618 whereby progressive proportionality between lengths is guaranteed, and because the net change of length of the assembly as a whole is substantially zero. This is because the sum of the lengths of the two shorter hoses comprised in first and third volumetrically compliant members 12 and 16 are equal to and oriented oppositely from the length of the longer hose comprised in second volumetrically compliant member 14.

In general, the pump 26 issues fluid flow comprising both constant and alternating flow components to the improved isolating hose assembly 10. The improved isolating hose assembly 10 acts as a low pass filter whereby the alternating flow component is bypassed out of the hydraulic system via displacing walls 56 of the volumetrically compliant members 12, 14 and 16. This is due in part to further transmission of remaining portions of the alternating flow component being impeded by the first or second inductive flow members 18 or 20, or the inductance of the output section 24 after being contained within respective volumetrically compliant members 12, 14 or 16, respectively. In particular, the majority of the alternating flow component is bypassed out of the hydraulic system by the first volumetrically compliant member 12. Thus, the overwhelming majority of the alternating flow component is limited to the first volumetrically compliant hose section 12. In operation, the intended purpose of the improved isolating hose assembly 10 is to attenuate most of the alternating flow component issuing from the pump 26 and deter it from entering the control valve 28 wherein it would otherwise generate objectionable sound pressure.

Figure 2:
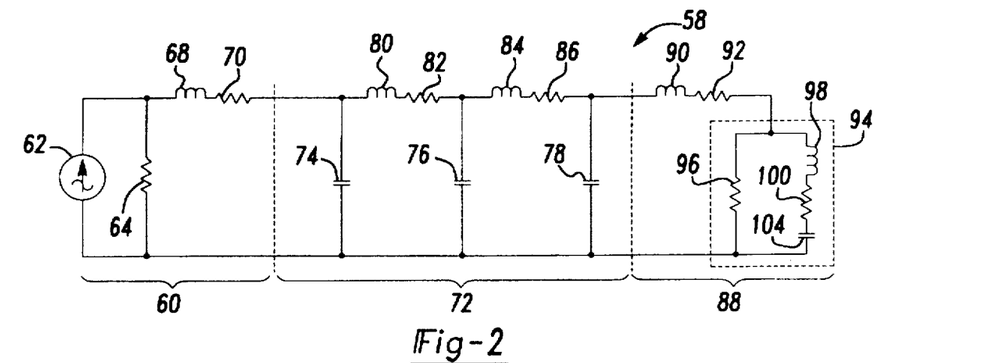
FIG. 2 is an equivalent circuit diagram useful for analyzing the performance of the improved isolating hose assembly in accordance with the preferred embodiment of the invention.

As an aid to analyzing improved isolating hose assembly 10 it is expedient to utilize equivalent circuit 58 schematically shown in FIG. 2. In equivalent circuit 58, a source section 60 comprising an alternating flow source 62 (i.e., emulating the alternating flow component issuing from the pump) is placed in parallel with a resistor 64 (i.e., emulating the flow resistance of the pump's bypass flow regulator 66 depicted in FIG. 1) and in series with an inductor 68 and resistor 70 (i.e., emulating the various pump passages, orifices, fittings and the input line 22). The source section 60 is coupled to a filter section 72 comprising a number of discrete circuit elements which emulate the various volumetrically compliant and inductive flow members described above. In particular, the first, second and third volumetrically compliant members 12, 14 and 16 are represented by capacitors 74, 76 and 78, respectively, while the first and second inductive flow members 18 and 20 are represented by inductor 80 and resistor 82, and inductor 84 and resistor 86, respectively. Finally, the filter section 72 is coupled to a load section 88 comprising an inductor 90 and a resistor 92 (i.e., emulating the output section 24) in series with a load impedance 94. The load impedance 94 comprises a resistor 96 which emulates the alternating flow resistance of the control valve 28, and a series arrangement of an inductor 98 and resistor 100 which emulate the inductance and resistance of a cylinder line 102, and a capacitor 104 which emulates the capacitance of the volume of fluid in a power cylinder 106 of the steering gear 30.

In analyzing the equivalent circuit 58, it is convenient to calculate values for the various elements of the circuit and then analyze the circuit according to the ladder method as explained in a book by H. Skilling entitled *Electrical Engineering Circuits* and published by John Wiley & Sons, Inc. Because resistors 64 and 96 emulate square law orifices, their resistance values are equal to twice the ratio of the constant pressure thereacross divided by fluid flow therethrough. Each of the capacitance values is determined by the ratio of its respective volume (i.e., in the case of the volumetrically compliant members, the product of active hose length and cross sectional area) divided by its effective bulk modulus. The effective bulk modulus for the volumetrically compliant members is found by dividing a delta pressure value by its fractional volume change over that delta pressure value for the particular hose material utilized.

Each of the inductance values is determined by the product of fluid density and individual line length divided by its cross sectional area. (In the event of a particular line being a collection of differing line segments, the sum of the inductances of all of the line segments is utilized.) Each of the associated resistance values is determined by calculating static pressure drop therethrough via calculating its Reynolds number and friction factor, and then appropriately evaluating the Bernoulli equation as described in a book by J. Vennard entitled *Elementary Fluid Mechanics* and also published by John Wiley & Sons, Inc. As before, the resistance value is equal to twice the ratio of the constant pressure thereacross divided by fluid flow therethrough.

Each capacitor's impedance is determined by the function $1/(j\omega C)$ where $j$ is the imaginary constant, $\omega$ is radian frequency and $C$ is the individual capacitance value. And, each inductor's impedance is determined by the function $(R+j\omega L)$ where $R$ is the individual resistance value and $L$ is the individual inductance value.

Real testing of such systems is conducted by maintaining system pressure at a fixed value and sweeping pump speed through a range such as from 900 rpm to 3,600 rpm. During such a sweep of pump speed, the internal pump delivery rate varies in the same ratio, or in this case, over a one to four ratio of delivery rates. Since the external pump delivery rate is held constant by a bypass flow regulator 66 comprised within the pump 26, it follows that the resistance value associated with resistor 64 varies from perhaps infinity (i.e., where the bypass flow regulator 66 is closed) to one third of the resistance value of the resistor 96 associated with the control valve 28. Because the admittance value of the resistor 64 is of concern, and since even the lowest such value is relatively high compared with any of the reactive impedance values for all but the highest frequencies associated with the higher speeds, the lowest value thereof is typically used in the analysis.

In using the ladder method, a unit value of alternating flow is assumed to flow through the load section 88. Then all of the alternating pressures present at the various equivalent circuit nodes, and the alternating flow therebetween are calculated using the procedure described in *Electrical Engineering Circuits*. The impedance seen by the pump 26 is determined from the ratio of the calculated values for alternating pressure at the resistor 64 divided by alternating flow from the pump 26. The actual value of alternating pressure at the resistor 64 (and therefore the pump 26) is found by the product of actual alternating flow from the pump 26 and the impedance seen by the pump 26. The actual value of alternating pressure at the control valve 28 is obtained by multiplying the actual value of alternating pressure at the resistor 64 by the ratio of calculated alternating pressure at the load impedance 94 divided by the calculated value for alternating pressure at the resistor 64.

Figure 3A:
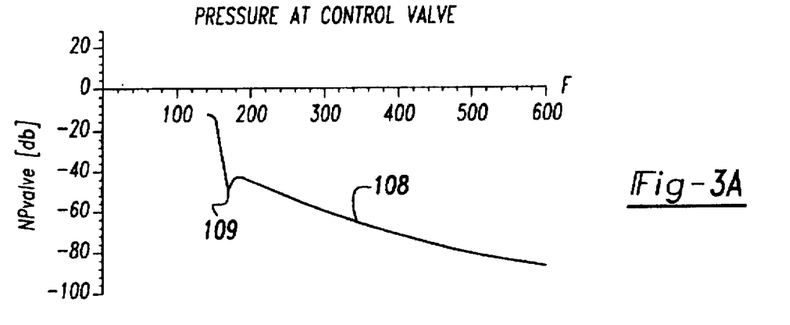
FIGS. 3A and 3B are graphs depicting alternating pressure present within a steering gear control valve as attained with an improved isolating hose assembly constructed in accordance with the preferred embodiment of the invention.

Shown in FIG. 3A is a curve 108 depicting theoretical alternating pressure values present at the load impedance 94

(i.e., in the control valve 28). Curve 108 is based upon an analysis of equivalent circuit 58 and plotted in decibels relative to 1 psi. It was calculated assuming the following values:

$Q_{62}$=0.084 (f/f$_o$) in.$^3$/sec.,
$R_{64}$=103 lb.sec./in.$^5$,
$L_{68}$=0.0207 lb.sec.$^2$/in.$^5$,
$R_{70}$=6.43 lb.sec./in.$^5$,
$C_{74}$=0.000182 in.$^5$/lb.,
$C_{76}$=0.000295 in.$^5$/lb.,
$C_{78}$=0.000113 in.$^5$/lb.,
$L_{80}$=0.0181 lb.sec.$^2$/in.$^5$,
$R_{82}$=1.01 lb.sec./in.$^5$,
$L_{84}$=0.0283 lb.sec.$^2$/in.$^5$,
$R_{86}$=1.57 lb.sec./in.$^5$,
$L_{90}$=0.0207 lb.sec.$^2$/in.$^5$,
$R_{92}$=1.15 lb.sec./in.$^5$, and
$R_{96}$=310 lb.sec./in.$^5$,
$L_{98}$=0.0178 lb.sec.$^2$/in.$^5$,
$R_{100}$=0.5 lb.sec./in.$^5$, and
$C_{104}$=0.00005 in.$^5$/lb.

where $Q_{62}$ is the alternating flow issuing from alternating flow source 62, f is frequency [in Hz], f$_o$ is the lowest pump frequency (i.e., 150 Hz in the case of curve 108, which value is associated with engine idle speed), and the various R, L and C values are resistance, inductance and capacitance values associated with the subscripted component reference numbers.

Actual performance of the improved isolating hose assembly 10 will be influenced by various system resonances. These can either be mechanical or hydraulic in nature. Further, they can result in alternating pressure peaks or notches. One hydraulic resonance that results in an alternating pressure notch is evident at notch 109 of the curve 108. Notch 109 occurs as a direct result of a resonance between $L_{98}$ and $C_{104}$ as damped by $R_{100}$.

In any case, the curve 108 depicts a significant reduction in fluid borne noise level as a result of utilizing the improved isolating hose assembly 10 of the present invention. However, at selected frequencies where any of the volumetrically compliant members 12, 14 or 16 are integer multiples of half wavelengths long, they can become resonant cavities whereby their effectiveness as capacitors to ground can be compromised. This effect is often exacerbated at the high system pressures encountered during parking. In some cases the second volumetrically compliant member 14 can become so compromised over a range of instant operating frequencies that there is a concomitant deleterious resonance. In particular, it has been found that this resonance can enable noise basically comprising the single resonant frequency to pass through an improved isolating hose assembly configured strictly according to the preferred embodiment.

Figure 3B:
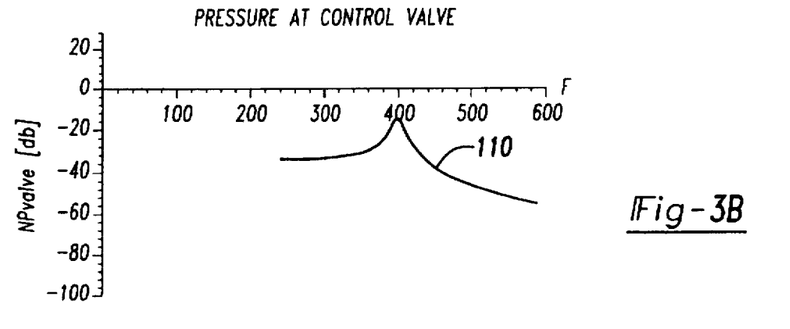

This effect can be demonstrated by substituting the significantly smaller value of $C_{76}$=0.0000145 in.$^5$/lb. for the capacitance value of the second volumetrically compliant member 14. When this substitution is made, equivalent circuit 58 becomes sharply resonant at about 410 Hz as is depicted in curve 110 shown in FIG. 3B. Curve 110 is plotted over the range of 250 Hz to 600 Hz although in actuality it is valid only at the resonant frequency of 410 Hz. It has been found in practice that the effective length of the second volumetrically compliant member 14 tends to change somewhat as a function of actual pump speed. The result is that discernible resonance effects seem to be "pulled along" over a range of frequencies. This results in transmitted noise having an essentially pure tone at the driving, or resonant, frequency. While the pure tone is no where near as objectionable as the virtual "white noise" normally encountered in such systems, it would be preferable to eliminate it.

Figure 4:
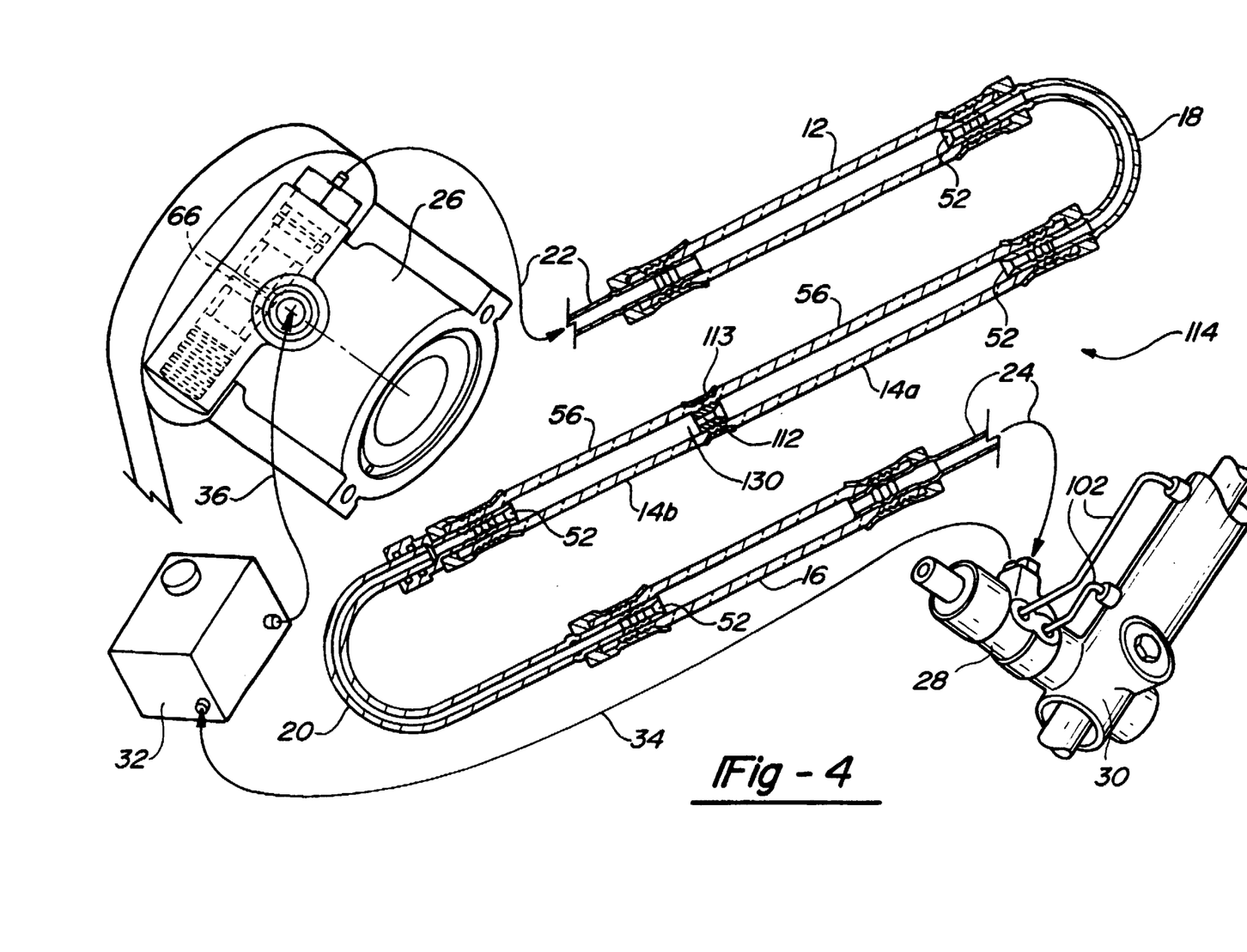
FIG. 4 is a partially schematic cross-sectional view of a modified isolating hose assembly in accordance with a first additional preferred embodiment of the invention.

Therefore, in a first additional preferred embodiment shown in FIG. 4, a resistive orifice or nozzle element 112 is introduced within the second volumetrically compliant member 14 in a modified isolating hose assembly 114. As a result, the second volumetrically compliant member 14 is broken into two cavities 14a and 14b, each having a higher resonant frequency. Moreover, the hydraulic resistance of the resistive orifice or nozzle element 112 is selected with a resistance value large enough to at least critically damp remaining resonances. The required resistance value is primarily determined by the unavoidable inductance value associated with the resistive orifice or nozzle element 112 itself. Specifically, it must be of at least similar value to the characteristic impedance formed by a sub-circuit comprising that inductance vs. a series arrangement of the effective capacitance values of the cavities 14a and 14b at the nominal resonant frequency thereof. Resistive orifice or nozzle element 112 is retained in its proper location between walls 56 of the cavities 14a and 14b via crimping a "wedding band" 113 therearound.

As a further step, disparate hose lengths are again chosen in order to avoid concomitant resonances among any of the resulting four volumetrically compliant sections. In particular, the respective hose lengths have been chosen according to the rules $I_{14a}$=1.18 $I_{12}$, $I_{14b}$=0.72 $I_{12}$, and $I_{16}$=0.85 $I_{12}$ where $I_{12}$ is the length of the first volumetrically compliant member 14, $I_{14a}$ is the length of the first cavity 14a, $I_{14b}$ is the length of the second cavity 14b, and $I_{16}$ is the length of the third volumetrically compliant member 16.

Figure 5:
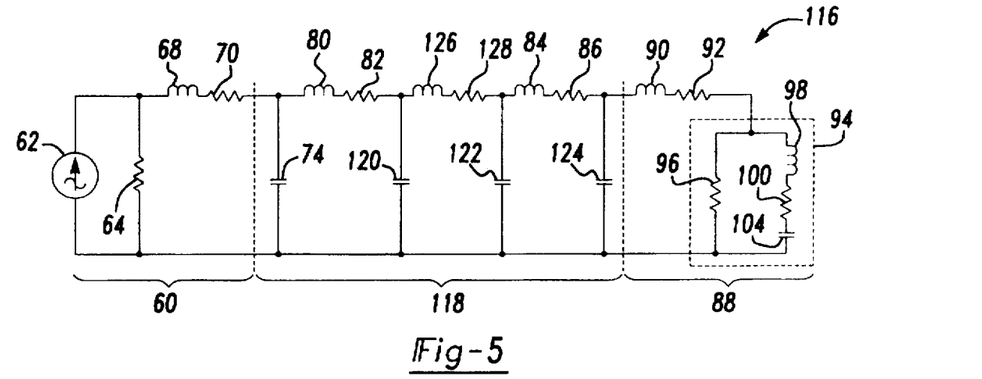
FIG. 5 is an equivalent circuit diagram useful for analyzing the performance of a modified isolating hose assembly in accordance with the first additional preferred embodiment of the invention.

As an aid to analyzing modified isolating hose assembly 114 it is expedient to utilize equivalent circuit 116 as schematically shown in FIG. 5. Source section 60 and load section 88 are again utilized in equivalent circuit 116. Similarly, filter section 118 utilizes capacitor 74, inductor 80 and resistor 82, and inductor 84 and resistor 86, each retaining its previous value. In addition, the two cavities 14a and 14b of second volumetrically compliant member 14 are represented by capacitors 120 and 122, respectively, while third volumetrically compliant member 16 has a different value than before and is now represented by capacitor 124. The resistive orifice or nozzle element 112 is represented by a series arrangement of inductor 126 and resistor 128.

As depicted in FIG. 4, the resistive orifice or nozzle element 112 is formed from a short length of thick walled tubing with its bore 130 formed in a nozzle shape. The diameter of the exit portion of the bore 130 is determined from the equation $$d = Sqrt[4/\pi]((Qp)/R_{128})^{0.25}$$

where d is the desired bore diameter, Q is the constant flow component, p is the fluid density and $R_{128}$ is the desired resistance value for resistor 128.

Figure 6A:
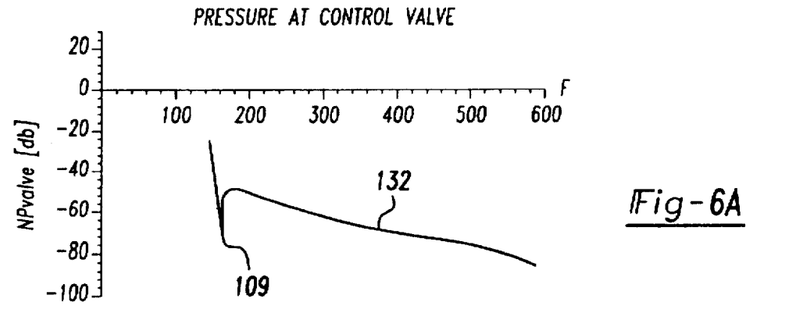
FIGS. 6A and 6B are graphs depicting alternating pressure present within the steering gear control valve as attained with a modified isolating hose assembly constructed in accordance with the first additional preferred embodiment of the invention.

Shown in FIG. 6A is a curve 132 depicting theoretical alternating pressure values present at the load impedance 94 (i.e., in the control valve 28). Curve 132 is based upon an analysis of equivalent circuit 116 and is again plotted in decibels relative to 1 psi. It was calculated assuming the following values:

$Q_{62}$=0.084 (f/f$_o$) in.$^3$/sec.,
$R_{64}$=103 lb.sec./in.$^5$, $L_{68}=0.0207$ lb.sec.$^2$/in.$^5$, $R_{70}=6.43$ lb.sec./in.$^5$, $C_{74}=0.000182$ in.$^5$/lb., $C_{120}=0.000215$ in.$^5$/lb., $C_{122}=0.000131$ in.$^5$/lb., $C_{124}=0.000155$ in.$^5$/lb., $L_{80}=0.0181$ lb.sec.$^2$/in.$^5$, $R_{82}=1.01$ lb.sec./in.$^5$, $L_{126}=0.00113$ lb.sec.$^2$/in.$^5$, $R_{128}=1.25$ lb.sec./in.$^5$, $L_{84}=0.0283$ lb.sec.$^2$/in.$^5$, $R_{86}=1.57$ lb.sec./in.$^5$, $L_{90}=0.0207$ lb.sec.$^2$/in.$^5$, $R_{92}=1.15$ lb.sec.in.$^5$, $R_{96}=310$ lb.sec./in.$^5$, $L_{98}=0.0178$ lb.sec.$^2$/in.$^5$, $R_{100}=0.5$ lb.sec./in.$^5$, and $C_{104}=0.00005$ in.$^5$/lb.

where $C_{122}$ and $C_{124}$ are values for capacitors 122 and 124, and $L_{126}$ and $R_{128}$ are values for inductor 126 and resistor 128, respectively.

Figure 6B:
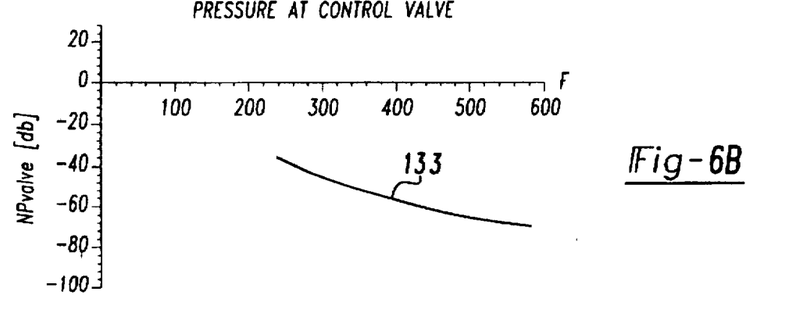

As before, curve 132 depicts a significant reduction in fluid borne noise level as a result of utilizing the modified isolating hose assembly 114 of the present invention. This time however, there are no resonances, such as that depicted in curve 110 of FIG. 3B, to contend with. As an example, curve 134 of FIG. 6B has been plotted from 250 Hz to 600 Hz using the following reduced capacitor values:

$C_{74}=0.0000911$ in.$^5$/lb., $C_{120}=0.0000215$ in.$^5$/lb., $C_{122}=0.000112$ in.$^5$/lb., and $C_{124}=0.000108$ in.$^5$/lb.

The comparison of curve 134 with curve 132 is much more favorable than a similar comparison of curve 110 with curve 108. For instance, curve 132 has suffered only 11.5 db degradation at 410 Hz when compared to curve 130 while curve 110 has suffered some 58 db degradation at 410 Hz when compared with curve 108!

Thus far, no consideration has been given to sound pressure present within the pump 26. This is because the pump 26 has been regarded as an alternating flow source having infinite source impedance as is mentioned above. However, it has been found that excessive sound pressure contained within the pump 26 can be transmitted as structure borne noise and is therefore undesirable. For this reason, isolating hose assemblies constructed according to the preferred and first additional preferred embodiments are always configured with minimal tubing lengths for input section 22. However, the above noted passageways, orifices and fittings as well as unavoidable tubing length for input section 22, result in an undesirable series configuration of inductive and resistive impedance between the pump 26 and the first volumetrically compliant member 14. This results in undesirable levels of sound pressure within the pump 26.

Figure 7:
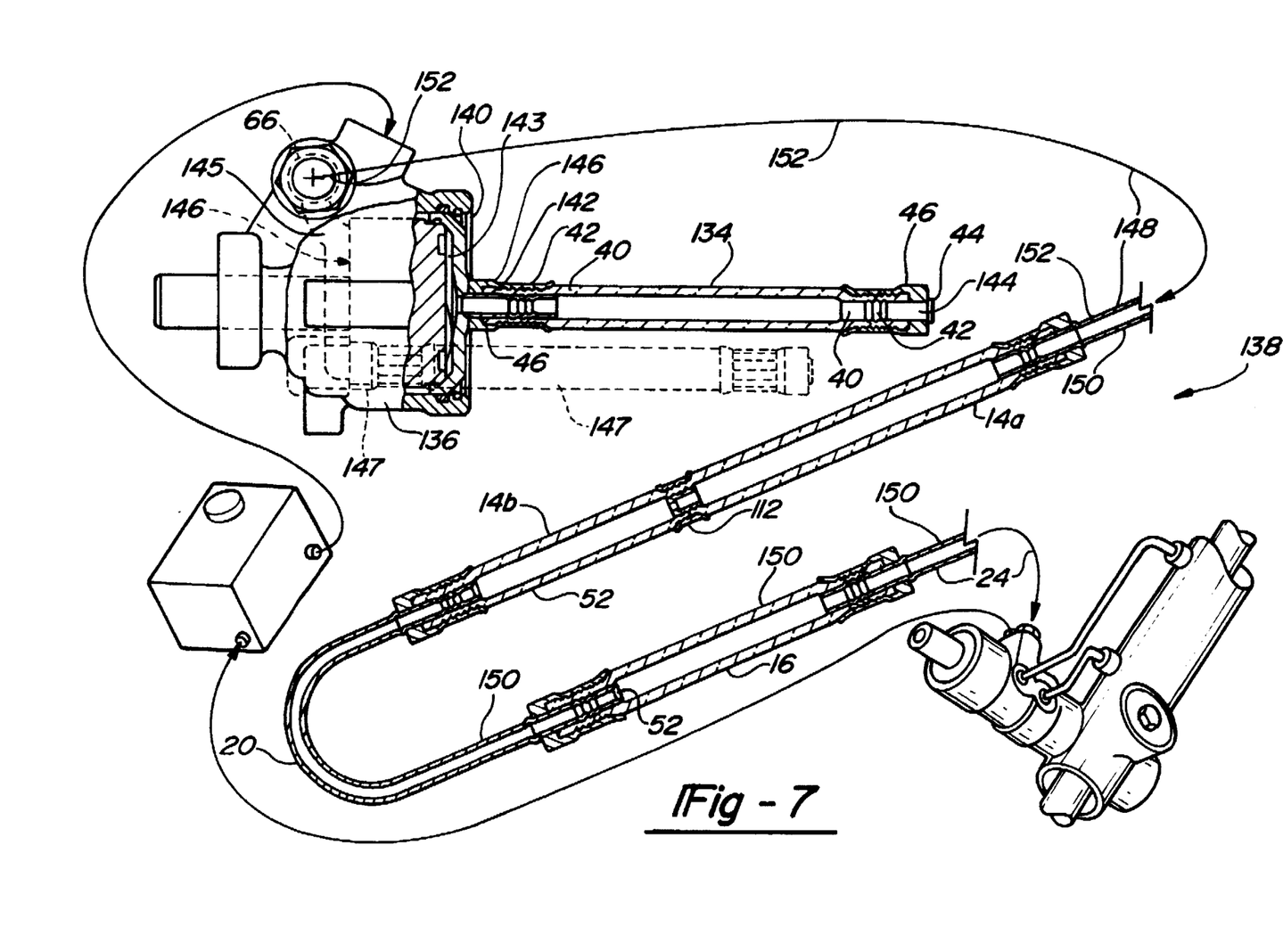
FIG. 7 is a partially schematic cross-sectional view of an improved apparatus for reduction of fluid and structure borne noise in accordance with a second additional preferred embodiment of the invention.

Therefore, in a second additional preferred embodiment, provision is made for mounting a first volumetrically compliant member 134 directly on a modified pump 136 in an improved apparatus for reduction of fluid and structure borne noise 138 as shown in FIG. 7. A first end of the first volumetrically compliant member 134 is hydraulically coupled to a cavity 143 located under a cover plate 140 of the pump 136 via a fitting 142 comprising a taper section 40 and "ripple" section 42. The other end of the first volumetrically cally compliant member 134 is sealed by a plug 144 comprising a taper section 40, "ripple" section 42 and a position locating flange 44. Two collar fittings 46 are then crimped to either end of the first volumetrically compliant member 134 to complete its implementation and enable hydraulic coupling of the volumetrically compliant member 134 to internal output ports 146 of the pump 26 via the cavity 143.

Of course, the first volumetrically compliant member 134 can be hydraulically coupled to any internal portion of the pump 26 that, in turn, is hydraulically coupled to its internal output ports 146. This not only includes the cavity 143, but could, for instance, include any portion of an internal cavity 145 leading to the pump's bypass flow regulator 66. Such an orientation is indicated by dotted outline 147 in FIG. 7.

Any such placement results in the first volumetrically compliant member 134 being hydraulically coupled directly to internal output ports 146 of pump 136 with a minimal inductive impedance therebetween as unavoidably imposed by the fitting 142. Not only does this reduce levels of sound pressure within the pump 136, it makes beneficial use of the impedances presented by the above noted output passageways, orifices and fittings of the pump 136, and input tubing section 148 of a new, and simpler, hose assembly 150 in a combined inductive and resistive flow member 152 which implements the function of the first inductive flow member 18. In this case, output passageways in the pump 26 and the input tubing section 148 together form the inductive flow member 152. And, in some cases the input tubing section 148 may be formed from small bore tubing similarly to the first inductive flow member 18. The hose assembly 150 may then comprise remaining portions of either of the improved isolating hose assembly 10 or the modified isolating hose assembly 114.

As shown in FIG. 7, the hose assembly 150 comprises cavity 14a, cavity 14b, second inductive flow member 20, third volumetrically compliant member 16 and output section 24 elements of the modified isolating hose assembly 114. It also comprises a resistive orifice or nozzle element 112 which has been modified as shown in order to minimize its minimal bore length and thus minimize its inductance. As before, openings 52 of each end of the second inductive flow member 20 are formed in a flared manner. In any case, the remaining hose assembly 150 is physically shorter (by the lengths of the first volumetrically compliant member 12 and the first inductive flow member 18) and suffers less pressure drop (because of the elimination of the first inductive flow member 18) than either the improved isolating hose assembly 10 or the modified isolating hose assembly 114.

Figure 8:
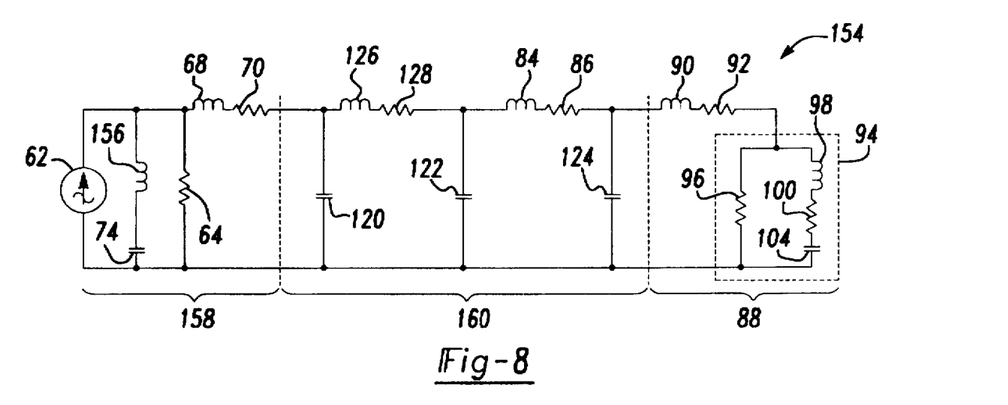
FIG. 8 is an equivalent circuit diagram useful for analyzing the performance of an improved apparatus for reduction of fluid and structure borne noise in hydraulic systems in accordance with the second additional preferred embodiment of the invention.

As an aid to analyzing the improved apparatus for reduction of fluid and structure borne noise 138 it is expedient to utilize equivalent circuit 154 as schematically shown in FIG. 8. Load section 88 is again utilized in equivalent circuit 154. This time however, capacitor 74, which this time represents the first volumetrically compliant member 134 but retains its previous value, is disposed in a series arrangement with an inductor 156 and is comprised within a new source section 158. In addition, new source section 158 comprises flow source 62, resistor 64, and inductor 68 and resistor 70. Inductor 68 and resistor 70 are again utilized in representing output passageways in the pump 26 and the input tubing section 148 because their values are exactly repeated in the analysis below. Finally, a new filter section 160 utilizes most of the other elements of the filter section 118 including capacitor 120, inductor 126 and resistor 128, capacitor 122, inductor 84 and resistor 86, and capacitor 124, each retaining its previous value.

Figure 9:
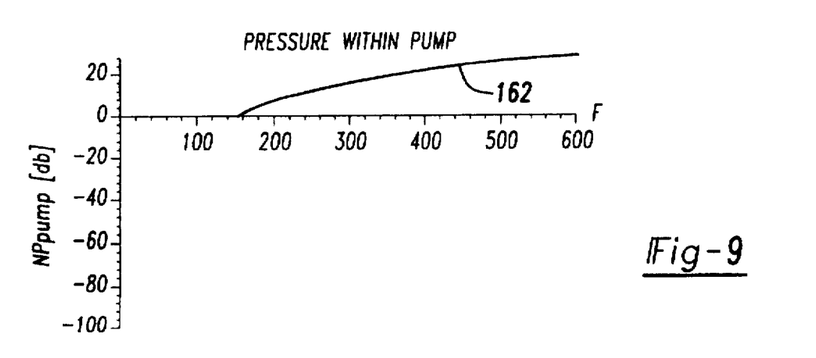
FIG. 9 is a graph depicting alternating pressure present within a pump as attained with a modified isolating hose assembly constructed in accordance with either of the preferred and first additional preferred embodiments of the invention.

Shown in FIG. 9 is a curve 162 depicting theoretical alternating pressure values present at the resistor 64 (i.e., within the pump 26) when used in conjunction with the modified isolating hose assembly 114. Curve 162 is based upon an analysis of equivalent circuit 116 and is plotted in decibels relative to 1 psi. Values plotted are all greater than 0 db and rise to 28 db (or about 25 psi) at 600 Hz.

Figure 10:
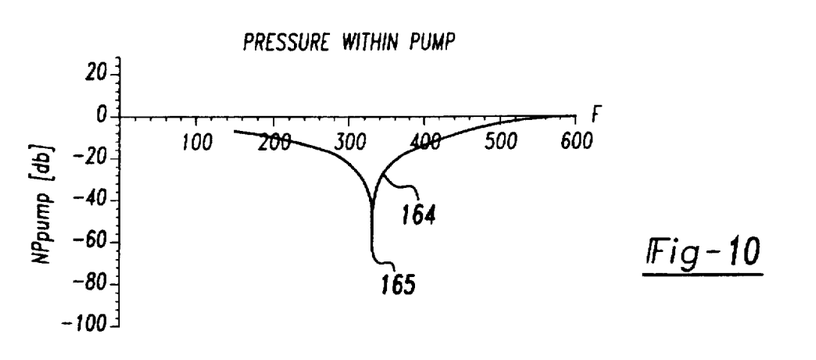
FIG. 10 is a graph depicting alternating pressure present within a pump as attained with an improved apparatus for reduction of fluid and structure borne noise in hydraulic systems constructed in accordance with the second additional preferred embodiment of the invention.

By way of contrast, shown in FIG. 10 is a curve 164 depicting theoretical alternating pressure values present at the resistor 64 when used in conjunction with the improved apparatus for reduction of fluid and structure borne noise 138. Curve 164 is based upon an analysis of equivalent circuit 154 and again plotted in decibels relative to 1 psi. It was calculated assuming the following values:

$Q_{62}$=0.084 (f/$f_o$) in.$^3$/sec.,
$R_{64}$=103 lb.sec./in.$^5$,
$L_{68}$=0.0207 lb.sec.$^2$/in.$^5$,
$R_{70}$=6.43 lb.sec./in.$^5$,
$L_{156}$=0.00129 lb.sec.$^2$/in.$^5$,
$C_{74}$=0.000182 in.$^5$/lb.,
$C_{120}$=0.000215 in.$^5$/lb.,
$C_{122}$=0.000131 in.$^5$/lb.,
$C_{124}$=0.000155 in.$^5$/lb.,
$L_{126}$=0.00113 lb.sec.$^2$/in.$^5$,
$R_{128}$=1.25 lb.sec./in.$^5$,
$L_{84}$=0.0283 lb.sec.$^2$/in.$^5$,
$R_{86}$=1.57 lb.sec./in.$^5$,
$L_{90}$=0.0207 lb.sec.$^2$/in.$^5$,
$R_{92}$=1.15 lb.sec./in.$^5$,
$R_{96}$=310 lb.sec./in.$^5$,
$L_{98}$=0.0178 lb.sec.$^2$/in.$^5$,
$R_{100}$=0.5 lb.sec./in.$^5$, and
$C_{104}$=0.00005 in.$^5$/lb.

where $L_{156}$ is the inductance of inductor 156. This time the values plotted are almost all less than 0 db and rise to only 1 db (or only 1.1 psi) at 600 Hz. Notch 165 in curve 164 occurs because of the series resonance between $L_{156}$ and $C_{74}$. It assumes its notch form (i.e., rather than a peak) because at resonance it presents a near zero impedance to alternating flow within the pump 26.

Figure 11:
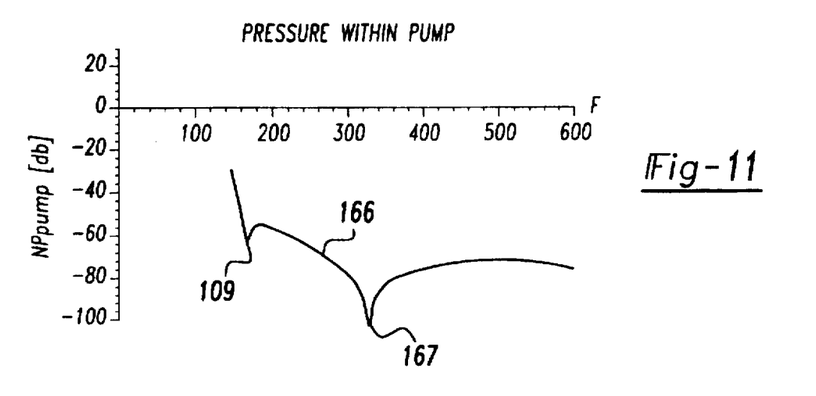
FIG. 11 is a graph depicting alternating pressure present within the steering gear control valve as attained with an improved apparatus for reduction of fluid and structure borne noise in hydraulic systems constructed in accordance with the second additional preferred embodiment of the invention.

Of course, since this near zero impedance to alternating flow provides a "sink" therefor, it follows that there must be some effect upon the alternating pressure present at the load impedance 94 as well. Shown in FIG. 11 is a curve 166 depicting theoretical alternating pressure values present at the at the load impedance 94 when used in conjunction with the improved apparatus for reduction of fluid and structure borne noise 138. Curve 166 is again based upon an analysis of equivalent circuit 154 and plotted in decibels relative to 1 psi. Curve 166 also has a notch 167 located at the same frequency as notch 165 in curve 164. And, alternating pressures depicted by curve 166 are less than those depicted by curve 164 up to about 450 Hz and slightly higher at higher frequencies.

Alternating pressures are slightly higher at the higher frequencies because the combination of $L_{156}$ and $C_{74}$ no longer acts like a capacitor. Rather, it is inductive and the alternating flow issuing from the pump 26 is merely divided between $L_{156}$ and $L_{68}$ according to the rules $L_{156}/(L_{156}+L_{68})$ and $L_{68}/(L_{156}+L_{68})$, respectively. In this case 94% of the alternating flow is bypassed through $L_{156}$ to $C_{74}$ and the remaining 6% passes on through $L_{68}$ to the filter section 160.

Sometimes it is not possible to affix the first volumetrically compliant member 134 to such a modified pump 136 because of geometric constraints imposed as a consequence of pump placement. Also, overall geometric constraints may limit available space for placement of a modified isolating hose assembly 114 as depicted in FIG. 4. In such a case, pump 26 and control valve 28 may be closely placed with the available space for an isolating hose assembly having limited volumetric size and odd geometric proportions.

Figure 12A:
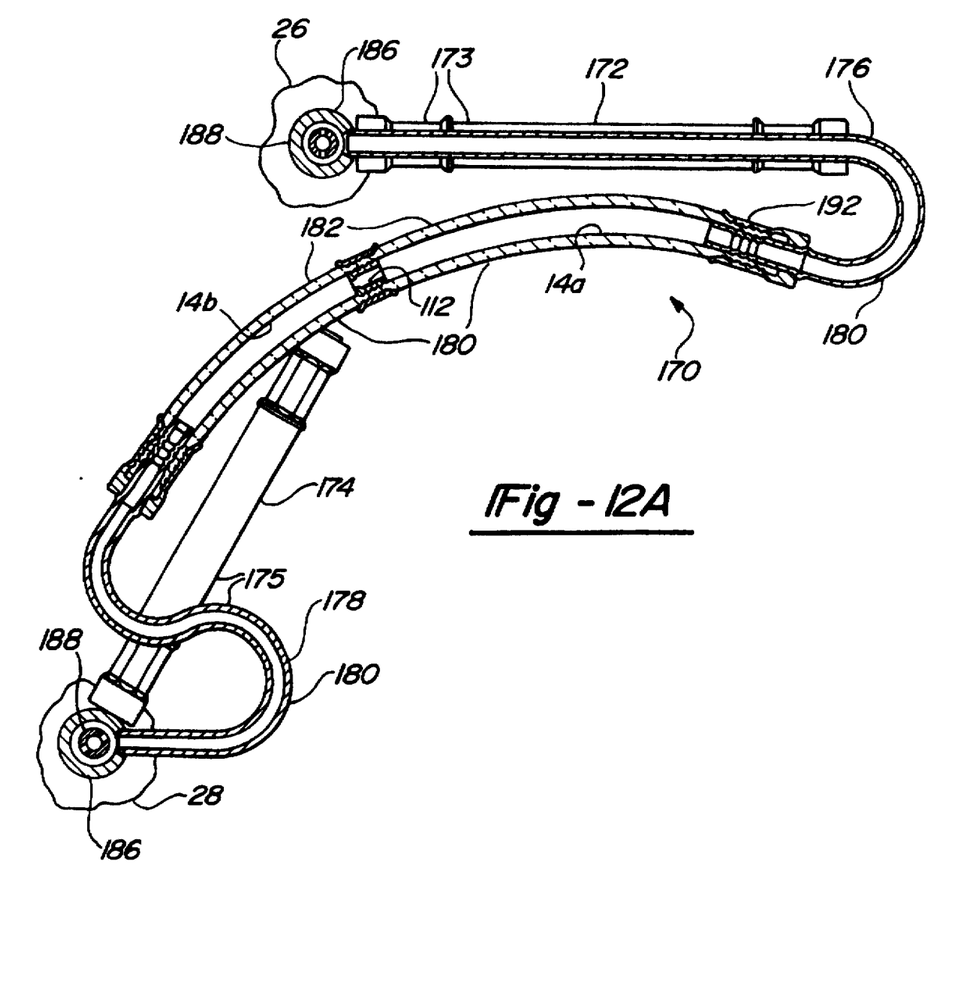
FIGS. 12A and 12B are cross-sectional views of a shortened noise suppression assembly in accordance with a third additional preferred embodiment of the invention.
Figure 12B:
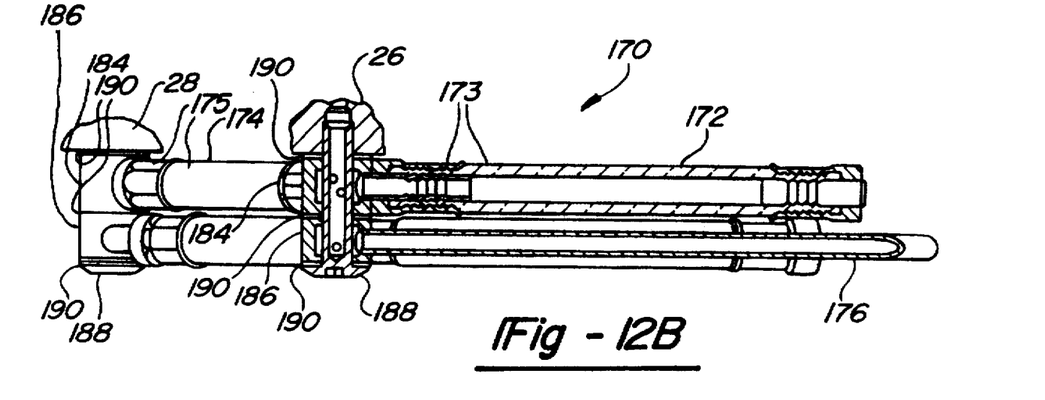

Therefore, in a third additional preferred embodiment shown in FIGS. 12A and 12B, a shortened noise suppression assembly 170 is presented wherein respective first and third volumetrically compliant members 172 and 174 are comprised within first and second stub lines 173 and 175, respectively. The stub lines 173 and 175 are physically placed in parallel with respective first and second inductive flow members 176 and 178 comprised in connective hose assembly 180. Thus, connective hose assembly 180 includes only one hose section 182 which comprises the two cavities 14a and 14b, and the resistive orifice or nozzle element 112. In order to accommodate multi-directional variation in the placement of the control valve 28 relative to the position of the pump 26, the hose section 182 is formed in a gentle arc as depicted in FIG. 12A.

Such physical constraints impose significant practical design difficulties in specific executions of the shortened noise suppression assembly 170. In the particular example depicted in FIGS. 12A and 12B, pump 26 and control valve 28 are closely spaced and the available space for a shortened noise suppression assembly 170 is severely limited. As an expedient means for simplifying formation of each of the elements of the shortened noise suppression assembly 170, first and second stub lines 173 and 175 are configured as separate hose assemblies comprising, and terminated by, banjo fittings 184. These are mounted underneath similar banjo fittings 186 on either end of connective hose assembly 180 and sealingly retained on pump and control valve ports by ported bolts 188 and soft washers 190 in a known manner.

While it would probably be possible to simplify the aforementioned practical design difficulties by replacing resistive orifice or nozzle element 112 with an intermediate block comprising a suitable resistive orifice or nozzle element and first and second separate hoses comprising the cavities 14a and 14b (not shown), the associated fittings and passages would unavoidably impose significant increases in its associated inductance value. As explained above with reference to modified isolating hose assembly 114, the required resistance value would have to be large enough to at least critically damp the hydraulic circuit comprising this larger inductance value with the series arrangement of the effective capacitance values of the cavities 14a and 14b. This would likely require a resistance value that would result in an unacceptable increase in pressure losses for the shortened noise suppression assembly 170.

For this reason, the first inductive flow member 176 has been increased in length in order to position input end 192 of single hose section 182 far enough away from control valve 28 to accommodate its required length. This is accomplished by forming the first inductive flow member 176 from tubing having a larger inside diameter. Thus, even though the first inductive flow member 176 is greater in length, its inductance can be maintained at the selected value as determined by the product of fluid density and its line length divided by its cross sectional area. On the other hand, the required length of second inductive flow member 178 is accommodated by forming it in a serpentine fashion as depicted most clearly in FIG. 12A.

Figure 13:
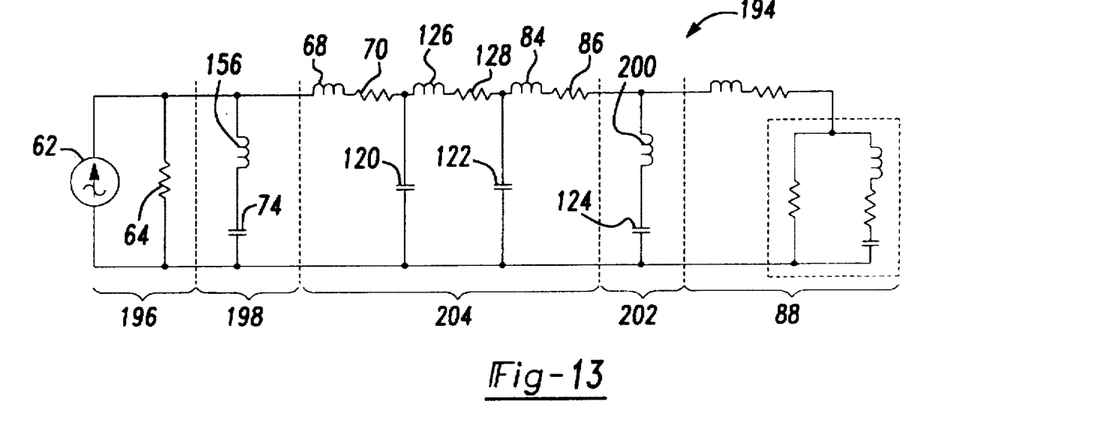
FIG. 13 is an equivalent circuit diagram useful for analyzing the performance of a shortened noise suppression assembly in accordance with the third additional preferred embodiment of the invention.

As an aid to analyzing the shortened noise suppression assembly 170 it is expedient to utilize equivalent circuit 194 as is schematically shown in FIG. 13. Load section 88 is again utilized in equivalent circuit 194 while alternating flow source 62 and resistor 64 are comprised in a new source section 196. This time the series arrangement of capacitor 74 and inductor 156, which together represent first stub line 173, are comprised within a separate first volumetrically compliant section 198. Similarly, a series arrangement of capacitor 124 and an inductor 200 represent second stub line 175 and are comprised within a separate third volumetrically compliant section 202. Finally, a connective hose section 204 comprises inductor 68 and resistor 70, capacitor 120, inductor 126 and resistor 128, capacitor 122, and inductor 84 and resistor 86.

Figure 14A:
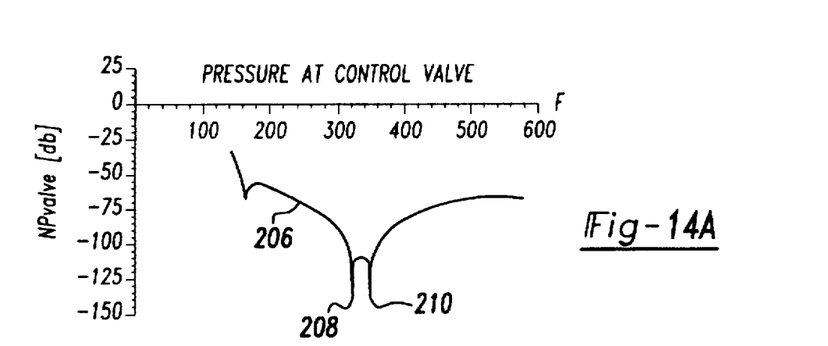
FIGS. 14A and 14B are graphs depicting alternating pressure present within the steering gear control valve as attained with first and second shortened noise suppression assemblies constructed in accordance with the third additional preferred embodiment of the invention.

In view of the fact that there are two separate capacitor/inductor series arrangements (e.g., first volumetrically compliant section 198 and third volumetrically compliant section 202) in the equivalent circuit 194, it is reasonable to expect that two notches will be present in the alternating pressure at the load impedance 94. This effect is clearly depicted in FIG. 14A wherein curve 206 depicts theoretical alternating pressure values present at the load impedance 94 when used in conjunction with a shortened noise suppression assembly 170 comprising the following values:

$Q_{62}$=0.084 (f/$f_o$) in.$^3$/sec.,
$R_{64}$=103 lb.sec./in.$^5$,
$L_{156}$=0.00129 lb.sec.$^2$/in.$^5$,
$C_{74}$=0.000182 in.$^5$/lb.,
$L_{68}$=0.0181 lb.sec.$^2$/in.$^5$,
$R_{70}$=6.43 lb.sec./in.$^5$,
$C_{120}$=0.000215 in.$^5$/lb.,
$L_{126}$=0.00113 lb.sec.$^2$/in.$^5$,
$R_{128}$=1.25 lb.sec./in.$^5$,
$C_{122}$0.000131 in.$^5$/lb.,
$L_{84}$=0.0283 lb.sec.$^2$/in.$^5$,
$R_{86}$=1.57 lb.sec./in.$^5$,
$L_{200}$=0.00129 lb.sec.$^2$/in.$^5$,
$C_{124}$=0.000155 in.$^5$/lb.,
$L_{90}$=0.0207 lb.sec.$^2$/in.$^5$,
$R_{92}$=1.15 lb.sec./in.$^5$,
$R_{96}$=310 lb.sec./in.$^5$,
$L_{98}$=0.0178 lb.sec.$^2$/in.$^5$,
$R_{100}$=0.5 lb.sec./in.$^5$, and
$C_{104}$=0.00005 in.$^5$/lb.

where $L_{200}$ is the inductance of inductor 200. In curve 206, resulting notches 208 and 210 are closely spaced at values of about 328 Hz and 355 Hz, respectively, as could have been determined in advance via use of the general formula $f_n$=1/(2πSqrt[LC]) where $f_n$ is the natural frequency of a series resonance between an inductance L and a capacitance C.

Closely spaced notches 208 and 210 result in such significantly low pressure values therefor that FIG. 14A had to be plotted with a different vertical scale in order to see them. Clearly it would be desirable to separate the notches 208 and 210 in order to spread their influence over a wider range of frequencies. Since the values of $C_{74}$ and $C_{124}$ have been determined by other system constraints, the only way to do this is to alter the values of $L_{156}$ and $L_{200}$. Generally, it would be desirable to increase the inductance value of one and decrease the inductance value of the other so as to move notch 208 to a lower frequency and notch 210 to a higher frequency. Increasing the inductance value in one of them simply requires its input banjo fitting to be provided with a smaller bore. Decreasing the inductance value in the other is not as simple as the following discussion illustrates.

The minimum practical inductance value is determined by the combination of the shortest length and largest bore possible for the appropriate input banjo fitting with reference to the available hose bore of φ10 mm. Unfortunately, such values have already been utilized in determining the above listed value of 0.00129 lb.sec.$^2$/in.$^5$ for both $L_{156}$ and $L_{200}$. The only practical answer is to convince hose manufacturers to make suitable volumetrically compliant hose having a larger bore so that, in turn, the appropriate one of the banjo fittings could be formed with a larger bore.

Presuming that such a hose having a larger bore would be geometrically similar to the present high compliance hose, it would also follow that volumetrically compliant members formed therefrom would be shorter in length. This would significantly relieve the above noted mentioned practical design difficulties by reducing the length of each of the volumetrically compliant members.

Figure 14B:
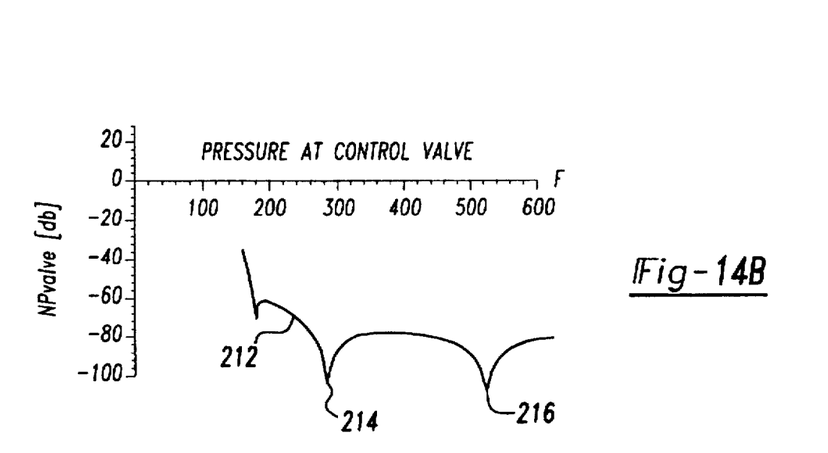

Presuming the future availability of such a hose having a larger bore, curve 212 of FIG. 14B depicts theoretical alternating pressure values present at the load impedance 94 when used in conjunction with a shortened noise suppression assembly 170 comprising the following values for $L_{156}$ and $L_{200}$:

$L_{156}$=0.00194 lb.sec.$^2$/in.$^5$,
$L_{200}$=0.000646 lb.sec.$^2$/in.$^5$.

Thus in curve 212, resulting notches 214 and 216 are suitably separated at values of about 268 Hz and 503 Hz, respectively.

Further reduction of fluid borne noise could be obtained by extended combinations of additional inductive flow members and volumetrically compliant members. Similarly, additional stub lines similar to first and second stub lines 173 and 175 but having still different resonant frequencies could be used. Further, small changes such as using an orifice in place of the nozzle shaped bore 130 could be made. Also, a shortened noise suppression assembly utilizing either of first stub line 173 or second stub line 175 could be used. In such a case the other of the volumetrically compliant members would simply assume the form utilized in either of improved isolating hose assembly 10 depicted in FIG. 1 or modified isolating hose assembly 114 depicted in FIG. 4. Or, the second stub line 175 could replace the series connected third volumetrically compliant member 16 in the improved apparatus for reduction of fluid and structure borne noise 138 depicted in FIG. 7. Thus, one skilled in the art will readily recognize from such discussion, and from the accompanying drawings and claims, that various changes, modifications and variations can be made therein without departing from the spirit and scope of the invention as defined in the following claims.

I claim:

1. An improved apparatus for reduction of fluid borne noise in a hydraulic system, said apparatus forming a passage and comprising:

a first, a second and a third volumetrically compliant member, said first, second and third volumetrically compliant members having circumferential walls of predetermined internal bore diameters, said walls being formed of a compliant material permitting volumetrical expansion of portions of said passage comprised therein in response to an increase in pressure;

at least one of said first and third volumetrically compliant members being comprised within a stub line and the remaining one, or ones, of said first, second and third volumetrically compliant members forming a conduit member, or members, comprised within said passage;

first and second inductive flow members each having a bore and a pair of ends, one of said pair of ends of said first inductive flow member being connected to one end of said second volumetrically compliant member and another end of said first inductive flow member being connected to said first volumetrically compliant member, one of said pair of ends of said second inductive flow member being connected to an other end of said second volumetrically compliant member and another end of said second inductive flow member being connected to said third volumetrically compliant member, said bores having diameters smaller than said predetermined bore diameters of said first, second and third volumetrically compliant members to restrict alternating flow of said fluid into said second conduit member and from said second volumetrically compliant member toward said third volumetrically compliant member;

an input member connected to said first volumetrically compliant member to permit introduction of a flow of fluid into said passage; and an output member connected to said third volumetrically compliant member to permit delivery of said flow of fluid from said passage to remaining portions of said hydraulic system.

2. The improved apparatus for reduction of fluid borne noise of claim 1, wherein each of said first, second and third volumetrically compliant members comprise a volumetrically compliant hose section.

3. The improved apparatus for reduction of fluid borne noise of claim 1, wherein either of said first and second inductive flow members comprises a tube having a bore formed with flared ends for enabling smooth fluid entry or exit from each conduit member and minimizing overall pressure loss of said apparatus.

4. The improved apparatus for reduction of fluid borne noise of claim 1, wherein a resistive element is located within said second volumetrically compliant member.

5. The improved apparatus for reduction of fluid borne noise of claim 4, wherein said resistive element comprises a nozzle.

6. A method for reducing fluid and structure borne noise in a hydraulic system, said method comprising the steps of:

hydraulically coupling a flow of fluid from a pump to a first volumetrically compliant member to bypass a majority of alternating fluid flow components of a hydraulic signal issuing therefrom;

passing remaining portions of said flow of fluid from said pump through an inductive input flow member to impede transmission of remaining alternating fluid flow components from said pump;

passing said flow of fluid from said inductive input flow member through a second volumetrically compliant member to bypass a majority of said remaining alternating fluid flow components;

passing said flow of fluid from said second volumetrically compliant member through an other inductive flow member to impede further transmission of yet remaining alternating fluid flow components beyond said second volumetrically compliant member; and hydraulically coupling said flow of fluid from said an other inductive flow member to a third volumetrically compliant member to substantially bypass all of said yet remaining alternating fluid flow components.

7. The method for reducing fluid and structure borne noise in hydraulic systems of claim 6, said method additionally comprising the step of passing said flow of fluid through said second volumetrically compliant member through a flow resistance introduced therein to eliminate the possibility of a deleterious resonance.

* * * * *